United States Patent [19]
Larson

[11] Patent Number: 5,947,670
[45] Date of Patent: Sep. 7, 1999

[54] SELF-DRILLING FASTENER

[75] Inventor: Paul M. Larson, Hoffman Estates, Ill.

[73] Assignee: Illinois Tool Works Inc., Glenview, Ill.

[21] Appl. No.: 08/717,171

[22] Filed: Sep. 20, 1996

[51] Int. Cl.⁶ ........................................ F16B 25/00
[52] U.S. Cl. .................. 411/387.5; 411/414; 411/387.1
[58] Field of Search .............................. 411/411, 414, 411/415, 386, 387.1–387.8; 52/410, 408

[56] References Cited

U.S. PATENT DOCUMENTS

| | | | |
|---|---|---|---|
| 3,221,588 | 12/1965 | Weiber | 411/414 |
| 3,865,006 | 2/1975 | Massoney | 411/414 |
| 3,882,756 | 5/1975 | Sauer et al. | 85/41 |
| 4,023,914 | 5/1977 | Holmes | 411/414 |
| 4,194,430 | 3/1980 | Muenchinger | 411/415 |
| 4,439,077 | 3/1984 | Godsted | 411/411 |
| 4,477,217 | 10/1984 | Bonacorsi | 411/387 |
| 4,630,984 | 12/1986 | Reinwall et al. | 411/386 |
| 4,693,654 | 9/1987 | Bettini | 411/387 |
| 4,749,322 | 6/1988 | Sygnator | 411/387 |
| 4,900,208 | 2/1990 | Kaiser et al. | 52/410 |
| 5,100,274 | 3/1992 | Hasan et al. | 411/371 |
| 5,141,376 | 8/1992 | Williams et al. | 411/387 |
| 5,143,498 | 9/1992 | Whitman | 411/82 |
| 5,217,339 | 6/1993 | O'Connor et al. | 52/410 |
| 5,304,023 | 4/1994 | Toback et al. | 411/387 |
| 5,413,444 | 5/1995 | Thomas et al. | 411/387 |

Primary Examiner—Flemming Saether
Assistant Examiner—Teri Pham
Attorney, Agent, or Firm—Schwartz & Weinrieb

[57] ABSTRACT

A self-drilling fastener includes an elongated shank region having first and second ends, a head at the first end and a drill point at the second end. Included in the shank region is a root having helical threads extending therefrom with a predetermined thread density. The threads are configured to extend onto the drill point, which point extends from the root, and has a conical point with a rounded tip and a flat side. The flat side defines a pair of drilling edges.

19 Claims, 2 Drawing Sheets 5,947,670

SELF-DRILLING FASTENER

RELATED APPLICATION

This application is related to copending commonly assigned U.S. Ser. No. 08/68,851 filed Aug. 15, 1996 and entitled "Gripping Plate for Attaching Roofing Membrane".

FIELD OF THE INVENTION

The present invention relates generally to threaded fasteners, and specifically to such fasteners having a self-drilling point for drilling through a metal sheet.

BACKGROUND OF THE INVENTION

In a modern construction process, especially in the construction of commercial buildings, self-drilling, self-tapping screws are needed that are capable of extruding through metal sheets, such as corrugated steel roof deck or steel studs, with relative ease to facilitate a rapid completion of construction projects. In addition, the screws must have high pullout values that is, greater holding power, so as to prevent them from being readily pulled out. For example, screws with the above-described qualities are needed in installations of commercial and factory roofs having a flat roof design. The roof installation involves placing a layer of insulation on the generally corrugated steel roof deck, and then covering the insulation with a single ply thermoplastic roofing membrane so as to protect the underlining roofing components against the elements. A common method of securing the roofing membrane to the roof is to attach the edges of the membrane to the deck using an elongated screw passing through a plate or washer placed on the membrane. It has been found that, because the membrane is exposed to the elements, it may at times be subject to high velocity winds blowing across the roof, which cause uplift forces. These forces cause the membrane to billow upwardly. As this occurs, the membrane tends to pull up and exerts an upward force on one edge of the plate, which causes the screw to eventually work its way out of the roof deck.

A known fastener for drilling through panel material, including a steel panel, is disclosed in commonly assigned U.S. Pat. No. 4,693,654 which is incorporated herein by reference. The screw of the '654 patent has a self-drilling tip formed by a pair of conical segments with each segment having a flat side and a rounded tip and with one segment being longitudinally offset with respect to the other. The screw of the '654 patent also features a quad-lead thread having two crests with a first diameter and two crests with a second larger diameter.

One disadvantage of the fastener disclosed in the U.S. Pat. No. 4,693,654 or of other conventional self-tapping, self-drilling screws of that type is that, especially when applied in a roof plate attachment system of the type described above, the threads are relatively shallow and therefore have a low pull-out value. In other words, screws of this type are more susceptible to the membrane pulling forces described above. Another disadvantage of such screws in the above-identified environment is that the threads stop at the base of the tip, requiring a longer time and more force before the threads catch a pilot hole. Contributing to this problem is the fact that the drill tip is relatively large for the purposes of drilling the pilot hole.

Another known fastener for drilling through a metal panel has a threaded shank portion that decreases in diameter towards a self-drilling tip, and which has a flute for directing metal shavings away from a hole being drilled by the fastener. The disadvantage of this fastener is that the threads stop well before reaching the drilling tip, requiring, as in the fastener disclosed in the U.S. Pat. No. 4,693,654, a longer time and more force before the threads catch the opening made by the drill tip.

OBJECTS OF THE INVENTION

Thus, it is a first object of the present invention to provide an improved self-drilling fastener that has threads that extend onto the drill point.

Another object of the present invention is to provide an improved self-drilling fastener that has a relatively small drill point.

A further object of the present invention is to provide an improved self-drilling fastener having a relatively fine thread for achieving greater thread-to-substrate contact than conventional fasteners.

Yet another object of the present invention is to provide an improved self-drilling fastener that can withstand substantial pull-out force exerted thereon.

Still another object of the present invention is to provide an improved self-drilling fastener having deeper threads with a modified buttress configuration for making more contact with a surrounding hole so as to withstand more pull-out force.

SUMMARY OF THE INVENTION

The above-identified objects are met or exceeded by the present self-drilling fastener, which includes an elongated shank region having first and second ends, a head at the first end and a drill point at the second end. The shank region includes a root having helical threads extending therefrom with a predetermined thread density. Significant in this fastener is that the threads are configured to extend onto the drill point. Also significant is that the drill point extends from the root, and has a conical shape with a rounded tip and a flat side, which defines a pair of drilling edges. Another important feature of the present invention fastener is that the threads are relatively dense, preferably on the order of 15 threads per inch. These features combine to maximize thread-to-substrate contact and to correspondingly increase the required pull-out value.

Various other objects, features, and attendant advantages of the present invention will be more fully appreciated from the following detailed description when considered in connection with the accompanying drawings in which like reference characters designate like or corresponding parts throughout the several views, and wherein:

DESCRIPTION OF THE PREFERRED EMBODIMENT

Figure 1:
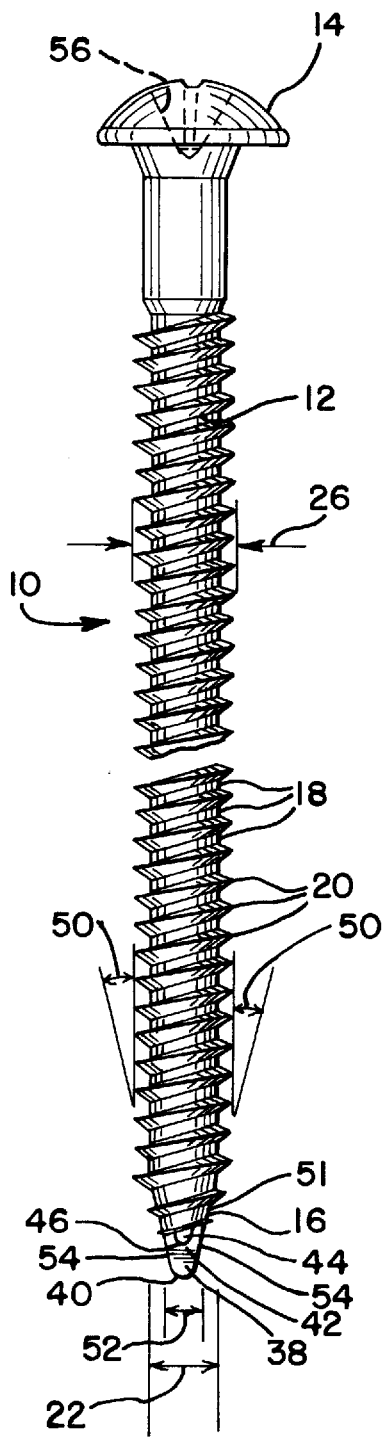
FIG. 1 is an elevational front view of the fastener of the present invention.
Figure 4:
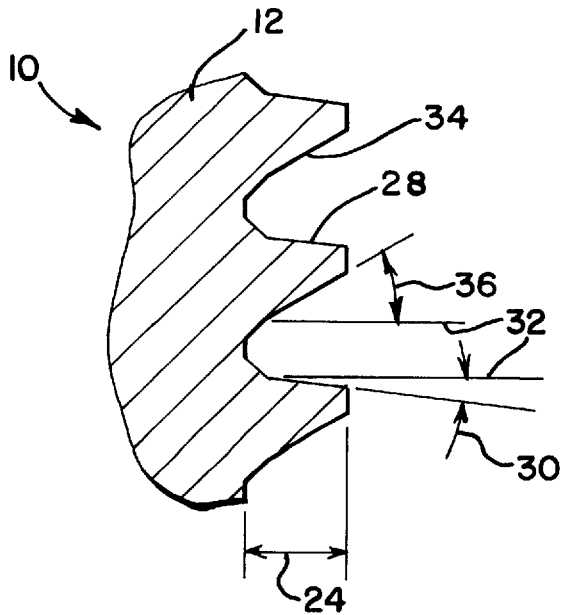
FIG. 4 is an enlarged fragmentary vertical sectional view of the threads on the fastener of the present invention.

Referring now to FIGS. 1–4, a self-drilling fastener is shown and generally designated at 10. Included on the fastener 10 is an elongated shank region 12 having two ends, a head 14 at one end and a drill point 16 at the opposite end. The shank region 12 includes a root 18 having helical threads 20 extending therefrom. In the preferred embodiment, the diameter 22 of the root 18, as best seen in FIG. 1, is between 0.156" to 0.166", and the height 24 of the threads 20, representing one axial half of the screw, best seen in FIG. 4, is between 0.047" to 0.051" extending outwardly from the root 18, while the diameter 26 of the threads 20, including the root diameter, as best seen in FIG. 1, is between 0.250" to 0.262". Naturally, it is contemplated that the above-listed dimensions may vary depending on the particular application for which the fastener 10 is employed. Generally, the threads 20 should extend outwardly a distance in the range of about ½ the diameter of the root 18, which is longer relative to the root 18 than the threads on the conventional fasteners. This allows the threads 20 to better capture the substrate material, thus increasing the holding power of the fastener.

Depending on the task for which the fastener 10 is being used, it is important that the fastener 10 have proper thread density that is, the number of threads per inch (TPI). In general, for use with metal panels or metal substrates, such as 22 gauge steel (0.030 inch) utilized in metal roofs, the range of thread density should be greater than 13 and less than 17 TPI. It is contemplated that the present fastener 10 is most suitable for use with substrates of 18 gauge or thinner. If the thread density is 13 TPI or lower, the threads 20 will not have sufficient contact with the panel, which will result in the fastener 10 having an undesirable "play" and an increased tendency to loosen, whereas if the thread density is 17 TPI or greater, the threads will be too thin and will break off under pressure. This is because the threads have to be made thinner to accommodate more threads within an inch length. In the preferred embodiment, the thread density is 15 TPI, which is the thread density appropriate for the fastener 10 when used with a gripping plate for attaching a roofing membrane. For comparison purposes, 15 TPI represents a thread crest-to-crest distance of 0.067 inch, which is approximately twice the thickness of the 22 gauge steel of a conventional roof deck. The preferred density, in combination with the relatively deep threads as discussed above, result in increased thread-to-substrate contact, and increase the holding power of the fastener 10 over conventional fasteners.

Referring now to FIG. 4, the threads 20 have a modified buttress configuration. A first support surface 28, which is on the top of each thread 20, is preferably oriented at an angle 30 of about 7 degrees with respect to a line 32 normal to the axis of the shank region 12. A second support surface 34, which is on the bottom of each thread 20 is inclined to the normal line 32 at an angle 36 of about 30 degrees. The modified buttress configuration, in combination with the above-described features of the root 18 and the threads 20, is designed to allow the fastener 10 to withstand a maximum pull-out force of about 700 lbs. when the fastener 10 is extruded into a panel or other substrate.

Extending from the root 18 at one end of the shank region 12, the drill point 16 has a conical point 38 having a rounded tip 40, and a flat side 42, as well as a base point 44 also having a rounded tip 46 and a flat side (not shown). A pair of cutting edges 54 are formed by edges of the flat side 42. The flat sides of the base point 44 and the conical point 38 are coplanar, with the tip 40 of the conical point 38 extending farther from the root 18 than the tip 46 of the base point 44. From the root 18, the drill point 16 tapers at an incline angle 50 of approximately 26 degrees, as best seen in FIG. 1, with respect to the longitudinal axis of the shank region 12 until it becomes the rounded tip 40 of the conical point 38. It is thus seen from FIG. 1 that as a result of the taper of the drill point end of the fastener shank 12, the fastener shank 12 comprises a constant diameter shank portion 21 extending from the head end of the fastener, and a tapered transitional shank portion 23 at the drill point end, and that the helical threads 20 extend continuously from the constant diameter shank portion 21 onto the tapered transitional shank portion 23.

One of the significant features of the present invention fastener 10 is that the threads 20 on the shank region 12 are configured to extend onto the drill point 16. The drill point 16 is considered to begin at a point end 51 where the drilling edges 54 end. However, in the manufacturing of the fastener 10, the process of bringing the threads 20 onto the drill point 16 causes the destruction of the original point end 51. In other words, the point end 51 is brought closer to the drill point 16. Thus, when the completed fastener 10 is viewed, the threads 20 decrease in diameter toward the conical point 38 and extend farther down the shank 12 to reach the base point 44. In the preferred embodiment, the threads 20 extend onto the drill point 16 until they reach a distance where a diameter 52 of the drill point 16 is about 0.110" to 0.125", as best seen in FIG. 1. With a thread density of 15 TPI, and because the threads extend farther down the tip, the threads are shallower nearer the tip. Thus, the fastener 10 has less chance to strip when inserted into a pilot hole and subsequently rotated so that the full diameter of the thread is engaged in the hole.

Another advantage of bringing the threads closer to the tip is that a smaller pilot hole is generated, which increases the surface contact between the threads and the substrate. Also, when the fastener 10 is used in relatively thin (18 to 22 gauge) roofing decks, the deck material is bent by the threading of the fastener therethrough, resulting in greater thread-to-substrate surface contact. If the present fastener 10 is used in thicker substrates than 18 gauge, there will be an increased tendency of the fastener 10 to seize in the pilot hole, which is undesirable.

In operation, the pair of drilling edges 54 defined by the flat side 42 of the conical point 38 drill an initial pilot hole so that the threads 20 can engage the hole. By, in effect, decreasing the diameter of the drill point 16, the fastener 10 is able to drill a smaller pilot hole with less force than that which would be required for conventional self-drilling fasteners with a conventional larger diameter drilling tip. In addition, in the present invention fastener 10, the threads 20 also engage the pilot hole earlier. This feature also increases the holding power of the fastener 10.

In the preferred embodiment, opposite the tip 40, the threads 20 end about 1" on a 5" fastener 10 before reaching the head 14, as best seen in FIG. 1. This arrangement allows the insertion of other materials between the panel and the head 14, such as a layer of insulation and a gripping plate used in attaching a roofing membrane to a roof. The threads 20 may be made to extend completely up to the head 14, or to any point before reaching the head 14, depending on the needs and preference of the user.

Figure 2:
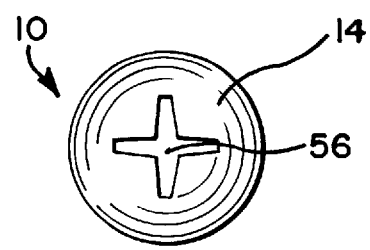
FIG. 2 is a top view of the present invention fastener.
Figure 3:
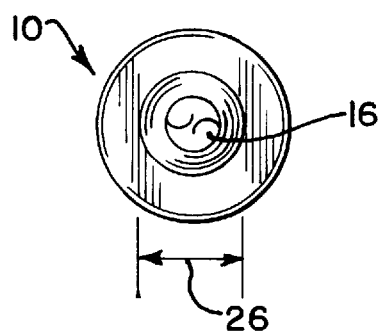
FIG. 3 is a bottom view of the present invention fastener.

Referring now to FIG. 2, the head 14 is shown attached to the end of the shank region 12 opposite the drill point 16. In the preferred embodiment, the head 14 has a Phillips-type recess 56 suitable for receiving a conventional driving tool. Other conventional types of head recesses 56 could also be used, including, but not limited to a hex, a slotted or a TOR-X type recess.

Figure 5:
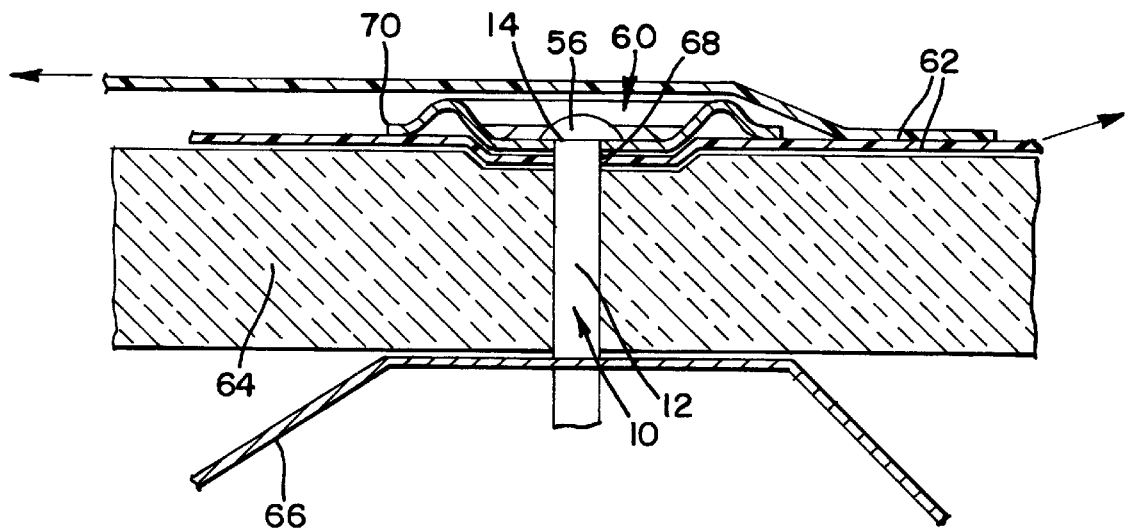
FIG. 5 is a sectional view of the gripping element of the present invention attached to a roof.

Referring now to FIG. 5, a fastener assembly is shown incorporating the fastener 10 and a gripping element generally designated 60. The gripping element 60 is basically a plate which is laid on the top of a thermoplastic roofing membrane 62, which is made of a durable, environmentally resistant material such as PVC. Beneath the roofing membrane 62 is a layer of insulation 64 which can be any conventional insulation material used in roofing installations, such as polyisocyanurate foam. A support for the insulation 64 is provided by a sheet of roof deck 66, which is preferably 22 gauge steel having a corrugated shape for added strength.

The fastener 10 secures the plate 60 to the roof deck 66. The fastener 10 is inserted through an opening 68 located generally in the center of the plate 60. Passing through the membrane 62 and the insulation 64, the fastener 10 is screwed into the roof deck 66.

Figure 6:
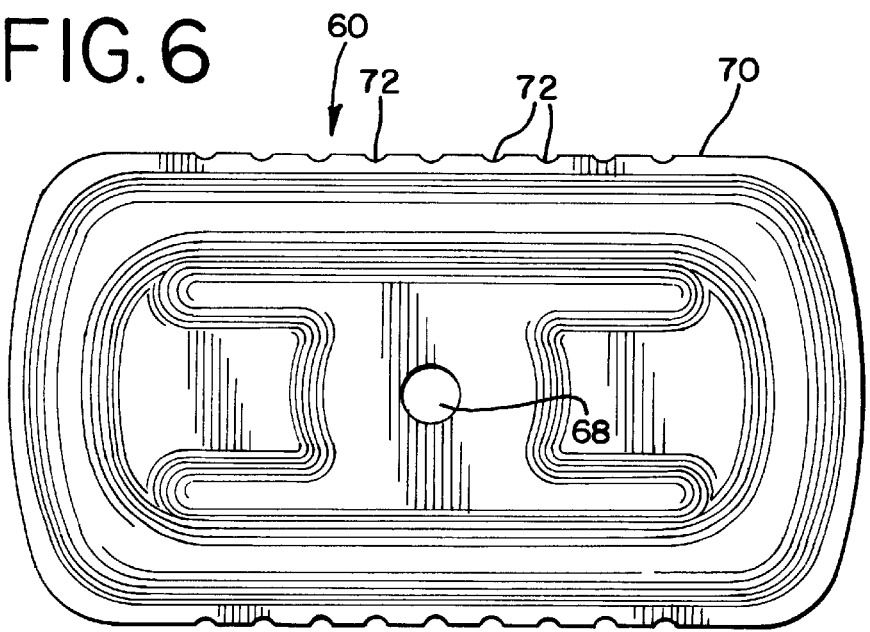
FIG. 6 is a top view of the present invention gripping element.

Referring now to FIG. 6, the gripping element 60 is basically a generally planar plate having an oblong peripheral edge 70. The plate 60 may be stamped from flat metal or it may be injection molded of suitably rigid and durable polymeric material such as nylon. In the preferred embodiment, the peripheral edge 70 includes a plurality of notches 72 spaced apart along the longer two sides 74. The notches 72 are configured to increase friction between the side edge 70 and the membrane 62 so as to prevent the membrane 62 from slipping relative to the plate 60. Accordingly, the notches 72 should be sufficiently deep to create friction required to prevent slippage, but not so deep as to cause tears in the membrane 62. In the preferred embodiment, the notches are approximately 0.015 inch deep. It is contemplated that the orientation, number, shape, depth and spacing of the notches 72 may vary with the application.

It will be appreciated that a significant advantage of the present self-drilling fastener is that it has a longer or deeper thread length relative to the diameter of the root. This, along with the modified buttress configuration of the threads and the specified thread density of about 15 TPI, combine to increase the pull-out value of the fastener. Another major advantage of this invention is that the drill point is relatively smaller in diameter, and the threads extend onto the drill point. This arrangement allows a relatively smaller pilot hole to be drilled with less force and in less time, and the threads to engage the pilot hole more securely than with conventional fasteners of this type.

While a particular embodiment of the self-drilling fastener of the invention has been shown and described, it will be appreciated by those skilled in the art that changes and modifications may be made thereto without departing from the invention in its broader aspects and as set forth in the following claims. It is therefore to be understood that within the scope of the appended claims, the present invention may be practiced otherwise than as specifically described herein.

What is claimed is:

1. A self-drilling fastener, comprising:
   an elongated shank portion defining a longitudinal axis and having first and second opposite ends; a head formed upon said first end of said elongated shank portion; and helical threads extending from an axial position near said first head end and toward said second opposite end of said elongated shank portion, and having a predetermined thread density;
   said second end of said elongated shank portion comprising a tapered transitional portion integrally incorporated within said second end of said elongated shank portion such that said elongated shank portion comprises a constant diameter shank portion and said tapered transitional portion, said helical threads disposed upon said elongated shank portion extending continuously between said constant diameter shank portion and said tapered transitional portion; and
   a drill point upon said second end of said elongated shank portion and comprising a non-threaded section extending from an end of said helical threads disposed near said second end of said elongated shank portion to a conical point having a rounded tip and including a flat side comprising a planar surface, said tapered transitional portion being interposed between said constant diameter shank portion and said non-threaded section of said drill point;
   wherein said planar surface of said flat side has a predetermined axial extent extending from said end of said helical threads to said rounded tip of said conical point, a pair of drilling edges extending along opposite sides of said planar surface of said flat side throughout said axial extent of said planar surface of said flat side so as to extend from said end of said helical threads to said rounded tip of said conical point, and a predetermined transverse extent extending continuously between said pair of drilling edges throughout substantially said predetermined axial extent thereof.

2. The self-drilling fastener as defined in claim 1 wherein:
   said threaded density of said helical threads of said shank portion is greater than 13 and less than 17 threads per inch.

3. The self-drilling fastener as defined in claim 1, wherein:
   said thread density of said helical threads of said shank portion is 15 threads per inch.

4. The self-drilling fastener as defined in claim 1, wherein:
   said elongated shank portion comprises a root portion; and
   at a point on said root portion, said helical threads extend radially outwardly a distance which is approximately one half the radius of said root portion.

5. The self-drilling fastener as defined in claim 4, wherein:
   said root portion has a diameter which is within the range of 0.156" to 0.166", and the height of said helical threads is within the range of 0.047" to 0.051".

6. The self-drilling fastener as defined in clam 1, wherein:
   said helical threads have a modified buttress configuration wherein a first support surface is oriented at a first predetermined angle with respect to a line normal to said longitudinal axis of said elongated shank portion, and a second surface is inclined with respect to said normal line at a second predetermined angle which is greater than said first predetermined angle of said first support surface.

7. The self-drilling fastener as defined in claim 6 wherein said first support surface is oriented at about 7 degrees to said normal line, and said second surface is inclined at about 30 degrees to said normal line.

8. The self-drilling fastener as defined in claim 1 wherein said drill point further includes a conical base with a flat side and a rounded tip, said flat sides of said conical base and said conical point being coplanar, with said tip of said conical point extending from said root farther than said tip of said conical base.

9. The self-drilling fastener as set forth in claim 1, wherein:
   said elongated shank portion comprises a root portion; and said root portion has a diameter which is within the range of 0.156" to 0.166", and the diameter of said helical threads is within the range of 0.250" to 0.262".

10. The self-drilling fastener as set forth in claim 1, wherein:
said helical threads have a predetermined diameter which decreases in the direction proceeding from said head end of said shank portion toward said drill point end of said shank portion.

11. A fastening assembly for attaching a roofing membrane onto a roof, comprising:
a generally planar plate member having an opening and a peripheral edge; and
a fastening element configured to be inserted through said opening of said generally planar plate member and including an elongated shank portion having a longitudinal axis and first and second opposite ends; a head defined upon said first end of said elongated shank portion; helical threads extending from an axial position near said first head end of said elongated shank portion, toward said second opposite end of said elongated shank portion, and having a predetermined thread density; said second end of said elongated shank portion comprising a tapered transitional portion integrally incorporated within said second end of said elongated shank portion such that said elongated shank portion comprises a constant diameter shank portion and said tapered transitional portion, said helical threads disposed upon said elongated shank portion extending continuously between said constant diameter shank portion and said tapered transitional portion; and a tapered drill point defined upon said second end of said elongated shank portion and comprising a non-threaded section extending from an end of said helical threads disposed near said second end of said elongated shank portion to a conical point having a rounded tip and including a flat side comprising a planar surface, said tapered transitional portion being interposed between said constant diameter shank portion and said non-threaded section of said drill point, wherein said planar surface of said flat side has a predetermined axial extent extending from said end of said helical threads to said rounded tip of said conical point, a pair of drilling edges extending along opposite sides of said planar surface of said flat side throughout said axial extent of said planar surface of said flat side so as to extend from said end of said helical threads to said rounded tip of said conical point, and predetermined transverse extent extending continuously between said pair of drilling edges throughout substantially said predetermined axial extent thereof.

12. The assembly as defined in claim 11 wherein said peripheral edge of said plate member has a plurality of gripping formations for preventing slippage of the membrane relative to said plate member.

13. The fastening assembly as set forth in claim 12, wherein:
said plate member has a substantially rectangular configuration and comprises a pair of oppositely disposed relatively long sides and a pair of oppositely disposed relatively short sides; and
said gripping formations are disposed along said pair of oppositely disposed relatively long sides of said plate member.

14. The fastening assembly as defined in claim 11, wherein:
said helical threads have a modified buttress configuration wherein a first support surface is oriented at a first predetermined angle with respect to a line normal to said longitudinal axis of said elongated shank portion, and a second surface is inclined with respect to said normal line at a second predetermined angle which is greater than said first predetermined angle of said first support surface.

15. The fastening assembly as set forth in claim 14, wherein:
said first support surface is oriented at approximately seven degrees with respect to said normal line; and
said second surface is inclined at approximately thirty degrees with respect to said normal line.

16. The fastening assembly as set forth in claim 11, wherein:
said thread density of said helical threads of said shank portion is between thirteen and seventeen threads per inch.

17. The assembly as defined in claim 16 wherein said thread density is 15 threads per inch.

18. The fastening assembly as set forth in claim 11, wherein:
said second end of said elongated shank portion comprises a tapered transitional portion integrally incorporated within said second end of said elongated shank portion such that said elongated shank portion comprises a constant diameter shank portion and said tapered transitional portion;
said tapered transitional portion is interposed between said constant diameter shank portion and said non-threaded section of said drill point; and
said helical threads disposed upon said elongated shank portion extend continuously between said constant diameter shank portion and said tapered transitional portion.

19. The fastening assembly as set forth in claim 11, wherein:
said helical threads have a predetermined diameter which decreases in the direction proceeding from said head end of said shank portion toward said drill point end of said shank portion.

* * * * *